(12) United States Patent
Morita

(10) Patent No.: US 8,903,627 B2
(45) Date of Patent: Dec. 2, 2014

(54) CONTROL DEVICE OF INTERNAL COMBUSTION ENGINE

(75) Inventor: Koji Morita, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/260,003

(22) PCT Filed: Nov. 17, 2010

(86) PCT No.: PCT/JP2010/070437
§ 371 (c)(1),
(2), (4) Date: Sep. 23, 2011

(87) PCT Pub. No.: WO2012/066645
PCT Pub. Date: May 24, 2012

(65) Prior Publication Data
US 2013/0226436 A1    Aug. 29, 2013

(51) Int. Cl.
*B60T 7/12* (2006.01)
*F02D 41/02* (2006.01)
*F02D 19/08* (2006.01)

(52) U.S. Cl.
CPC .......... *F02D 41/0235* (2013.01); *F02D 19/084* (2013.01); *F02D 19/087* (2013.01); *F02D 19/088* (2013.01); *Y02T 10/36* (2013.01)
USPC .......................................... 701/103; 123/434

(58) Field of Classification Search
CPC ...... F02D 41/00; F02D 41/1446; F02D 41/18
USPC .......... 701/103–105; 123/434, 691, 692, 480
See application file for complete search history.

(56) References Cited

U.S. PATENT DOCUMENTS

| | | | | |
|---|---|---|---|---|
| 7,987,039 B2 * | 7/2011 | Takagawa | ..................... | 701/103 |
| 2001/0007192 A1 | 7/2001 | Suzuki et al. | | |
| 2004/0209734 A1 * | 10/2004 | Mitsutani | ..................... | 477/111 |
| 2007/0065341 A1 * | 3/2007 | Asanuma | ....................... | 422/62 |
| 2010/0070159 A1 * | 3/2010 | Iwahashi et al. | ............... | 701/105 |
| 2010/0191444 A1 * | 7/2010 | Aoki | ............................ | 701/109 |

(Continued)

FOREIGN PATENT DOCUMENTS

| | | |
|---|---|---|
| JP | A-5-209549 | 8/1993 |
| JP | A-11-247687 | 9/1999 |

(Continued)

OTHER PUBLICATIONS

International Search Report issued in International Application No. PCT/JP2010/070437 on Feb. 15, 2011 (with translation).

*Primary Examiner* — John Kwon
(74) *Attorney, Agent, or Firm* — Oliff PLC

(57) ABSTRACT

When alcohol mixing fuel is supplied to an internal combustion engine, an intake air flow rate is detected and a basic amplitude amount α of an upstream target air-fuel ratio abyfr corresponding to this detected intake air flow rate is calculated. Next, alcohol concentration in the fuel (in more detail, ethanol concentration Cetha) and a cooling water temperature (or an intake air temperature) are detected, hydrogen concentration Ch in a mixing exhaust gas is calculated based on the detected ethanol concentration Cetha and the detected cooling water temperature (or the detected intake air temperature) amplitude gain β corresponding to the calculated hydrogen concentration is calculated and finally, an amplitude amount (α×β) of the upstream target air-fuel ratio is calculated.

4 Claims, 6 Drawing Sheets

(56) References Cited

U.S. PATENT DOCUMENTS

2011/0282541 A1* 11/2011 Kidokoro et al. ............... 701/29
2012/0006307 A1*  1/2012 Demura ........................ 123/674
2013/0138329 A1*  5/2013 Aoki ............................ 701/104
2013/0192209 A1*  8/2013 Tsukagoshi et al. ............ 60/276

FOREIGN PATENT DOCUMENTS

| JP | A-2001-182595 | 7/2001 |
| JP | A-2002-147270 | 5/2002 |
| JP | A-2007-231864 | 9/2007 |

* cited by examiner upstream air-fuel ratio abyfs downstream air-fuel ratio afdown

CONTROL DEVICE OF INTERNAL COMBUSTION ENGINE

BACKGROUND OF THE INVENTION

1. Technical Field

The present invention relates to a control device of an internal combustion engine for controlling the internal combustion engine. It should be noted that hereinafter, the internal combustion engine is also simply called as the "engine".

2. Related Art

Conventionally, there is a widely known control device of an internal combustion engine for performing feedback control on an air-fuel ratio of fuel-mixing air (hereinafter, also simply called as the "air-fuel ratio of the engine") supplied to the engine based on output values of an upstream air-fuel ratio sensor and a downstream air-fuel ratio sensor respectively arranged in an exhaust passage on the upstream side and the downstream side of a ternary catalyst (hereinafter, also simply called as the "catalyst"). In such a control device, the upstream air-fuel ratio sensor and the downstream air-fuel ratio sensor detect air-fuel ratios of an exhaust gas discharged from cylinders of the internal combustion engine to pass through the exhaust passage (hereinafter, called as the "mixing exhaust gas"). An air-fuel ratio feedback amount is calculated using the air-fuel ratios detected by these sensors. By adjusting an amount of fuel to be respectively jetted to the plurality of cylinders based on this air-fuel ratio feedback amount, the feedback control is performed in a manner that the air-fuel ratio of the engine matches a target air-fuel ratio.

Regarding such air-fuel ratio control, for example, the following Patent Document 1 discloses an exhaust emission purification device that sets a target air-fuel ratio (hereinafter, also called as the upstream target air-fuel ratio) of an air-fuel ratio of an engine (that is, an air-fuel ratio of a mixing exhaust gas flowing into a catalyst) in accordance with an atmosphere in an interior of the catalyst (that is, a reduction atmosphere or an oxidation atmosphere). This conventional exhaust emission purification device is provided with a catalyst atmosphere detection means that detects whether an atmosphere of a catalytic converter is the reduction atmosphere or the oxidation atmosphere by a second exhaust gas detection means (downstream air-fuel ratio sensor) provided on the downstream side of the catalytic converter, and also provided with a catalyst atmosphere adjustment means for, when an exhaust gas purification state by the catalytic converter is degraded, in accordance with a detection result of the catalyst atmosphere detection means, adjusting the atmosphere of the catalytic converter into an atmosphere different from the detection result. In this case, specifically, the internal combustion engine is provided with an air-fuel ratio forcible alteration means capable of forcibly altering the air-fuel ratio between an air-fuel ratio on the rich side and an air-fuel ratio on the lean side at predetermined cycles and amplitudes. The catalyst atmosphere adjustment means adjusts an altering degree between the air-fuel ratio on the lean side and the air-fuel ratio on the rich side of the air-fuel ratio forcible alteration means in accordance with the detection result of the catalyst atmosphere detection means.

In recent years, alcohol such as ethanol is sometimes included in gasoline supplied to the engine as the fuel. For example, mainly known ethanol-containing gasoline fuel used for a so-called FFV (Flexible Fuel Vehicle) includes "E3" with 3% of ethanol concentration, "E85" with 85% of the same concentration, and "E100" of 100%-ethanol fuel. The ethanol concentration largely varies. It should be noted that in the case where alcohol is included in gasoline, such mixing fuel of gasoline and alcohol is hereinafter called as the "alcohol-mixing fuel" or simply called as the "fuel".

When such alcohol-mixing fuel is supplied to the engine, hydrogen concentration in the mixing exhaust gas is increased in comparison to the case where the fuel only made of gasoline is supplied to the engine. When the hydrogen concentration in the mixing exhaust gas is increased in such a way, hydrogen concentration in the interior of the catalyst arranged in the exhaust passage is also increased due to the mixing exhaust gas passing through. Since hydrogen acts as a so-called strongly reducing agent, by increasing the hydrogen concentration in the interior of the catalyst, the atmosphere in the interior of the catalyst becomes the reduction atmosphere.

Therefore, in the case where the feedback control is performed by altering the upstream target air-fuel ratio based on the detection result of the atmosphere of the catalytic converter by the second exhaust gas detection means (downstream air-fuel ratio sensor) as in the above conventional exhaust emission purification device, upon supplying the alcohol mixing fuel to the engine, there is a possibility that the second exhaust gas detection means (downstream air-fuel ratio sensor) falsely determines that the atmosphere in the interior of the catalytic converter is the oxidation atmosphere even when the atmosphere is the reduction atmosphere. As a result, there is sometimes a case where proper setting in accordance with the atmosphere in the interior of the catalyst cannot be performed. Regarding this point, the following Patent Document 2 shows that in an internal combustion engine to which alcohol mixing fuel can be supplied, a discrepancy of a detected value of a downstream air-fuel ratio sensor (oxygen concentration sensor) arranged on the downstream side of a catalyst is corrected in accordance with concentration of alcohol included in the alcohol mixing fuel (hereinafter, called as the "alcohol concentration").

PATENT DOCUMENTS

Patent Document 1 Japanese Patent Application Publication No. 2002-147270
Patent Document 2 Japanese Patent Application Publication No. 1993(H05)-209549

SUMMARY OF THE INVENTION

A cause of false detection of the atmosphere in the interior of the catalyst by the downstream air-fuel ratio sensor in a state where the alcohol mixing fuel is supplied to the engine may be a volume of a flow rate of intake air taken into the internal combustion engine. That is, when the flow rate of the intake air taken into the internal combustion engine is increased, there is sometimes a case where the mixing exhaust gas (specifically, nitrogen oxide (NOx)) passes through the interior of the catalyst without being reduced (so-called blow-by). In this case, since the downstream air-fuel ratio sensor outputs an output value in accordance with the air-fuel ratio of the blowing-by mixing exhaust gas, there is a possibility of falsely determining that the interior of the catalyst is changed into the oxidation atmosphere even when the interior sufficiently keeps the reduction atmosphere.

Also in the case where such false determination is caused, the upstream target air-fuel ratio is changed from the air-fuel ratio on the lean side of an ideal air-fuel ratio into the air-fuel ratio on the rich side. Thereby, unburned matters (HC, CO, and the like) that are apt to be generated due to a change into the air-fuel ratio on the rich side flow into the interior of the catalyst. In this case, since the interior of the catalyst is the reduction atmosphere, there is a fear that the flowing-in HC, CO, and the like flow out to an exterior without being purified (oxidized).

Therefore, in general, in the case where the intake air flow rate is increased in accordance with an operation state of the internal combustion engine, response delay of the downstream air-fuel ratio sensor, control delay of the upstream target air-fuel ratio, and the like are taken into consideration. When the upstream target air-fuel ratio is altered from the theoretical air-fuel ratio to the lean side or the rich side, width of such alteration (hereinafter, also called as the "amplitude") is reduced, so that the upstream target air-fuel ratio is determined. Thereby, an amount of NOx, HC, CO, and the like flowing into the interior of the catalyst is relatively decreased, and it is possible to properly detect the atmosphere in the interior of the catalyst and to prevent flowing out of these emissions to the exterior.

However, in a state where the amplitude from the theoretical air-fuel ratio to the lean side or the rich side is small, even when the upstream target air-fuel ratio is repeatedly changed toward the lean side and the rich side for the purpose of activating a purification ability of the catalyst, there is sometimes a case where the purification ability of the catalyst cannot be sufficiently activated. As a result, there is a possibility that a purification rate of the emissions by the catalyst is decreased. In the case where the alcohol mixing fuel is supplied to the engine, particularly when the amplitude from the theoretical air-fuel ratio to the lean side is reduced, the amount of NOx flowing into the interior of the catalyst is decreased. Therefore, a consumption amount of hydrogen for purification (reducing) NOx is decreased, and the hydrogen concentration in the interior of the catalyst is maintained to be high. Thus, there is a possibility that the atmosphere in the interior of the catalyst is falsely detected as described above.

The present invention is achieved in order to solve the above problems, and an object thereof is to provide a control device of an internal combustion engine capable of reliably determining an atmosphere in an interior of a catalyst in the case where alcohol mixing fuel is supplied to the engine, and determining a target air-fuel ratio of fuel-mixing air supplied to the engine reflecting the determined atmosphere.

A control device of an internal combustion engine according to the present invention in order to achieve such an object (present control device) is applied to an internal combustion engine including a fuel-mixing air supply means that supplies fuel-mixing air made of fuel including at least gasoline and air to a combustion chamber of the internal combustion engine, a catalyst arranged in an exhaust passage through which an exhaust gas discharged from the combustion chamber passes, an air-fuel ratio sensor arranged at least in the exhaust passage on the downstream side of the catalyst, the air-fuel ratio sensor that generates an output value in accordance with the air-fuel ratio of the exhaust gas passing through the exhaust passage, and a target air-fuel ratio setting means that sets a target air-fuel ratio of the fuel-mixing air based on the output value from the air-fuel ratio sensor. That is, the present control device is applied to the internal combustion engine to which alcohol mixing fuel mixed with gasoline and alcohol can be supplied.

In an aspect, the control device of the internal combustion engine according to the present invention includes a hydrogen concentration detection means and a correction means. The hydrogen concentration detection means detects hydrogen concentration in the exhaust gas discharged from the combustion chamber. The correction means corrects the target air-fuel ratio set by the target air-fuel ratio setting means based on the hydrogen concentration detected by the hydrogen concentration detection means.

According to these, the target air-fuel ratio can be corrected in accordance with the hydrogen concentration in the exhaust gas. Thereby, in a state where the hydrogen concentration in the exhaust gas is high, that is, the hydrogen concentration in the interior of the catalyst is high, by utilizing reduction force of hydrogen as a strongly reducing agent (in other words, by consuming hydrogen), the target air-fuel ratio is set on the leaner side, so that increasing NOx can favorably be purified (reduced), for example. By consuming hydrogen in such a way, for example, the hydrogen concentration in the interior of the catalyst can be lowered. As a result, false determination that the interior of the catalyst is changed into an oxidation atmosphere even when the interior keeps a reduction atmosphere can be prevented. Therefore, for example, by properly setting the atmosphere in the interior of the catalyst and generating proper purification ability in the catalyst, flowing out of emissions to an exterior can effectively be prevented.

In another aspect, the control device according to the present invention includes an intake air flow rate detection means. The intake air flow rate detection means detects an intake air flow rate indicating mass of air taken into the internal combustion engine per unit time.

In the case where the intake air flow rate detection means is provided in such a way, the target air-fuel ratio setting means may set the target air-fuel ratio by changing an amplitude amount indicating a variation amount from a theoretical air-fuel ratio to the lean side or the rich side, based on the intake air flow rate detected by the intake air flow rate detection means. The correction means may, at least, correct the changed amplitude amount from the theoretical air-fuel ratio to the lean side based on the hydrogen concentration detected by the hydrogen concentration detection means.

According to these, even in a state where the flow rate of the intake air taken into the internal combustion engine is increased and blow-by can be caused from the catalyst, as long as the hydrogen concentration in the exhaust gas is high, that is, the hydrogen concentration in the interior of the catalyst is high, by utilizing the reduction force of hydrogen as the strongly reducing agent, NOx in the exhaust gas can favorably be purified (reduced). Thus, correction can be made in a manner that an amplitude amount to the lean side is increased. Thereby, for example, as to the air-fuel ratio sensor, detection of blowing-by NOx is effectively suppressed. Thus, the false determination that the interior of the catalyst is changed into the oxidation atmosphere even when the interior still keeps the reduction atmosphere can be prevented.

In still another aspect of the control device according to the present invention, the correction means corrects the target air-fuel ratio set by the target air-fuel ratio setting means in a manner that the higher the hydrogen concentration detected by the hydrogen concentration detection means is, the more the target air-fuel ratio is changed toward the lean side.

According to this, by setting the target air-fuel ratio in a manner that the higher the hydrogen concentration in the exhaust gas is, the target air-fuel ratio is changed toward the leaner side, it is possible to increase a consumption amount of hydrogen in the interior of the catalyst. By setting the target air-fuel ratio to the leaner side, alteration width when the target air-fuel ratio is repeatedly changed toward the lean side and the rich side for the purpose of activating the purification ability of the catalyst is increased, so that the purification ability of the catalyst is sufficiently activated. As a result, a purification rate of the emissions by the catalyst can be favorably maintained.

In further aspect, the control device according to the present invention includes an alcohol concentration detection means and a temperature detection means. The alcohol concentration detection means detects alcohol concentration as concentration of an alcohol component included in the fuel supplied to the combustion chamber of the internal combustion engine. The temperature detection means detects an operation state temperature of the internal combustion engine (such as a cooling water temperature and an intake air temperature).

In this case, the hydrogen concentration detection means may detect the hydrogen concentration in the exhaust gas based on the alcohol concentration detected by the alcohol concentration detection means and the operation state temperature detected by the temperature detection means.

According to this, there is no need to separately provide a sensor that directly detects the hydrogen concentration in the exhaust gas, and thus a configuration of the control device can be simplified and cost can be reduced.

In still further aspect of the control device according to the present invention, the target air-fuel ratio setting means sets the target air-fuel ratio to an air-fuel ratio on the rich side of the theoretical air-fuel ratio based on the output value of the air-fuel ratio sensor corresponding to a change in an interior of the catalyst from a reduction atmosphere that reduces the exhaust gas flowing into the catalyst into an oxidation atmosphere that oxidizes the exhaust gas flowing into the catalyst, and sets the target air-fuel ratio to an air-fuel ratio on the lean side of the theoretical air-fuel ratio based on the output value of the air-fuel ratio sensor corresponding to a change in the interior of the catalyst from the oxidation atmosphere into the reduction atmosphere. In this case, the air-fuel ratio sensor may be a concentration cell type oxygen concentration sensor.

According to this, by switching the target air-fuel ratio to the air-fuel ratio on the rich side of the theoretical air-fuel ratio or the air-fuel ratio on the lean side of the theoretical air-fuel ratio in accordance with the atmosphere in the interior of the catalyst (the oxidation atmosphere or the reduction atmosphere) by the target air-fuel ratio setting means, the emission purification ability of the catalyst can be properly exhibited. That is, by promptly setting the air-fuel ratio of the exhaust gas flowing into the catalyst to the air-fuel ratio on the rich side, HC, CO, and the like as unburned matters can be oxidized at a high purification rate by the catalyst of the oxidation atmosphere. By promptly setting the air-fuel ratio of the exhaust gas flowing into the catalyst to the air-fuel ratio on the lean side, nitrogen oxide (NOx) can be reduced at a high purification rate by the catalyst of the reduction atmosphere.

In the present control device, by utilizing excellent reduction force of hydrogen when the hydrogen concentration in the exhaust gas is high, even when the intake air flow rate is large, the target air-fuel ratio can be set on the leaner side. In this case, a large amount of NOx is purified (reduced) and the consumption amount of hydrogen is increased, so that, for example, the hydrogen concentration in the interior of the catalyst can be properly decreased, and for example, the atmosphere in the interior of the catalyst can be properly changed from the reduction atmosphere into the oxidation atmosphere. Thus, false detection of the atmosphere in the interior of the catalyst can be effectively prevented. Therefore, since the atmosphere in the interior of the catalyst can be properly detected, the target air-fuel ratio can be changed and set to the lean side or the rich side properly in accordance with the atmosphere in the interior of the catalyst. Thus, the emissions can be prevented from flowing out to the exterior.

PREFERRED EMBODIMENT OF THE INVENTION

Hereinafter, a control device of an internal combustion engine according to an embodiment of the present invention (hereinafter, also simply called as the "present device") will be described with reference to the drawings.

(Configuration)

Figure 1:
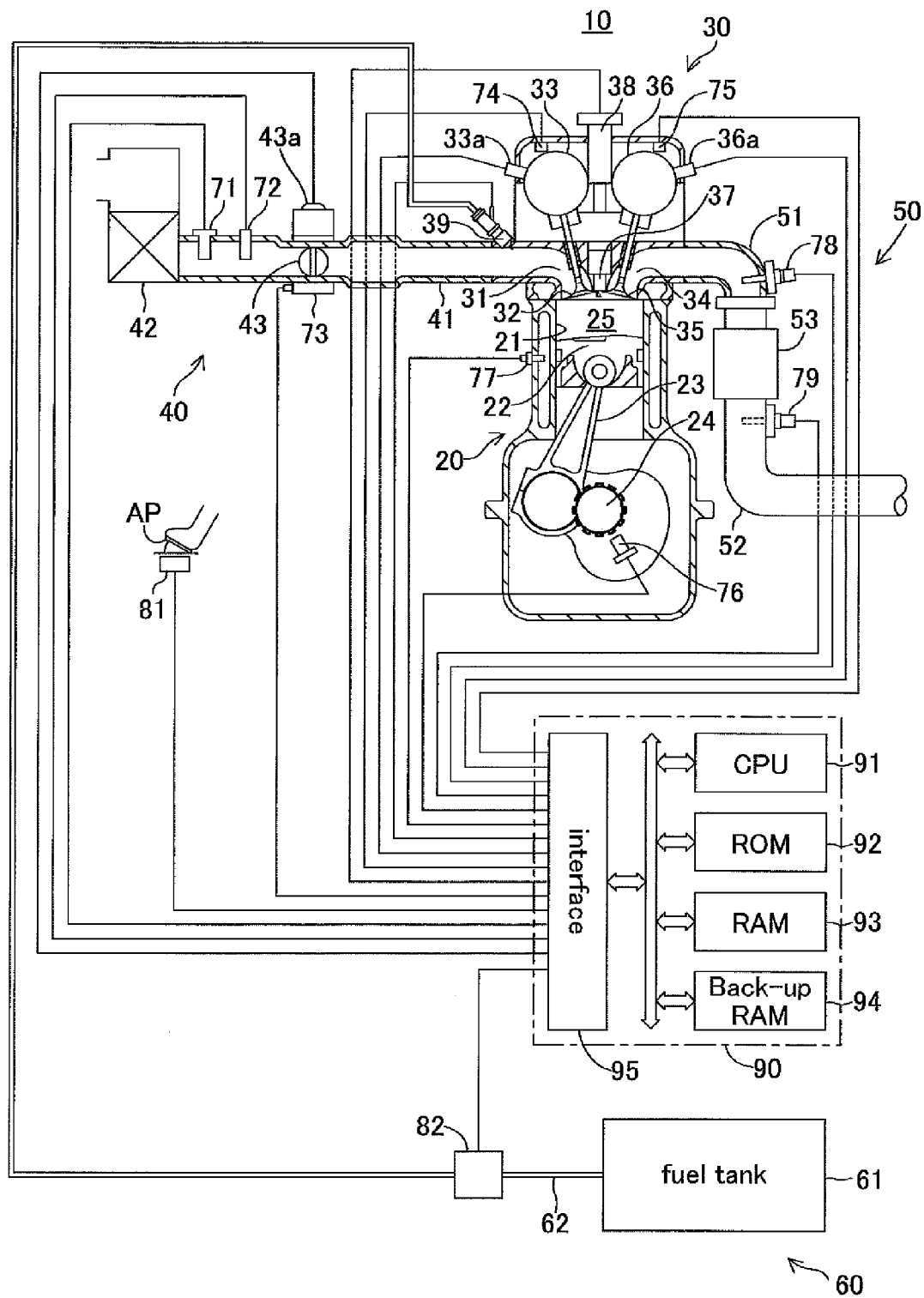
FIG. 1 is a schematic configuration diagram of a multi-cylinder internal combustion engine to which a control device according to an embodiment of the present invention is applied.

FIG. 1 shows a schematic configuration of a system applied to a four-stroke, spark-ignited, and multi-cylinder (in-line four-cylinder) internal combustion engine 10. It should be noted that, although FIG. 1 only shows a section of a particular cylinder, other cylinders are provided with the same configuration.

This internal combustion engine 10 includes a cylinder block portion 20 including a cylinder block, a cylinder block lower case, and an oil pan, a cylinder head portion 30 fixed onto the cylinder block portion 20, an intake system 40 that supplies fuel-mixing air of alcohol mixing fuel to the cylinder block portion 20, an exhaust system 50 for discharge an exhaust gas from the cylinder block portion 20 to an exterior, and a fuel system 60 that supplies the fuel to the intake system 40.

The cylinder block portion 20 includes a cylinder 21, a piston 22, a connecting rod 23, and a crankshaft 24. The piston 22 reciprocates in the cylinder 21, reciprocating motion of the piston 22 is transmitted to the crankshaft 24 through the connecting rod 23, and thereby, the crankshaft 24 is rotated. A wall surface of the cylinder 21 and an upper surface of the piston 22 form a combustion chamber 25 with a lower surface of the cylinder head portion 30.

The cylinder head portion 30 includes an intake port 31 in communication with the combustion chamber 25, an intake valve 32 for opening and closing the intake port 31, a variable intake timing control device 33 including an intake cam shaft (not shown) for driving the intake valve 32, the variable intake timing control device for continuously changing a phase angle of the intake cam shaft, an actuator 33a of the variable intake timing control device 33, an exhaust port 34 in communication with the combustion chamber 25, an exhaust valve 35 for opening and closing the exhaust port 34, a variable exhaust timing control device 36 including an exhaust cam shaft (not shown) for driving the exhaust valve 35, the variable exhaust timing control device for continuously changing a phase angle of the exhaust cam shaft, an actuator 36a of the variable exhaust timing control device 36, an ignition plug 37, an igniter 38 including an ignition coil that generates high voltage to be applied to the ignition plug 37, and an injector 39 for jetting the fuel into the intake port 31.

The intake system 40 is provided with an intake pipe 41 including an intake manifold connected to the intake port 31 in each of the cylinders, an air filter 42 provided in an end of the intake pipe 41, a throttle valve 43 provided inside the intake pipe 41, the throttle valve for varying an intake opening area, and an actuator 43a of the throttle valve 43. At least the intake port 31, the injector 39, the intake pipe 41, and the throttle valve 43 form a fuel-mixing air supply means.

The exhaust system 50 is provided with an exhaust manifold 51 connected to the exhaust port 34 in each of the cylinders, an exhaust pipe 52 connected to a collection part of the exhaust manifold 51, and a catalyst 53 (ternary catalyst) arranged in the exhaust pipe 52. The exhaust port 34, the exhaust manifold 51, and the exhaust pipe 52 form an exhaust passage.

The fuel system 60 is provided with a fuel tank 61, and a fuel supply pipe 62. The fuel tank 61 is to store the "alcohol mixing fuel" made by mixing gasoline and ethanol, for example. It should be noted that gasoline-only fuel containing no ethanol and ethanol-only fuel containing no gasoline may be charged in the fuel tank 61. The fuel supply pipe 62 is a pipe connecting the fuel tank 61 and the injector 39. The fuel in the fuel tank 61 is pressure-fed to the injector 39 through the fuel supply pipe 62 by a fuel pump (not shown) arranged inside the fuel tank 61.

Meanwhile, this system is provided with a hot-wire air flow meter 71, an intake air temperature sensor 72, a throttle position sensor 73, an intake cam position sensor 74, an exhaust cam position sensor 75, a crank position sensor 76, a water temperature sensor 77, an upstream air-fuel ratio sensor 78, a downstream air-fuel ratio sensor 79, an accelerator press-down degree sensor 81, and an alcohol concentration sensor 82.

The air flow meter 71 outputs a signal in accordance with a mass flow rate Ga of intake air flowing in the intake pipe 41 (mass of the air taken into the engine 10 per unit time (also called as the "intake air flow rate" in the present invention)). The intake air temperature sensor 72 outputs a signal in accordance with an intake air temperature THA of the intake air flowing in the intake pipe 41. The throttle position sensor 73 detects an opening degree of the throttle valve 43, and outputs a signal indicating a throttle valve opening degree TA.

The intake cam position sensor 74 is arranged in the vicinity of the intake cam shaft. The intake cam position sensor 74 generates a signal having one pulse for every time when the intake cam shaft is rotated by 90° (that is, when the crankshaft 24 is rotated by 180°). The exhaust cam position sensor 75 is arranged in the vicinity of the exhaust cam shaft. The exhaust cam position sensor 75 generates a signal having one pulse for every time when the exhaust cam shaft is rotated by 90° (that is, when the crankshaft 24 is rotated by 180°).

The crank position sensor 76 outputs a signal having a wide pulse every time when the crank shaft 24 is rotated by 360°. This signal indicates engine rotation speed NE. The water temperature sensor 77 detects a temperature of cooling water of the engine 10, and outputs a signal indicating a cooling water temperature THW.

Figure 2:
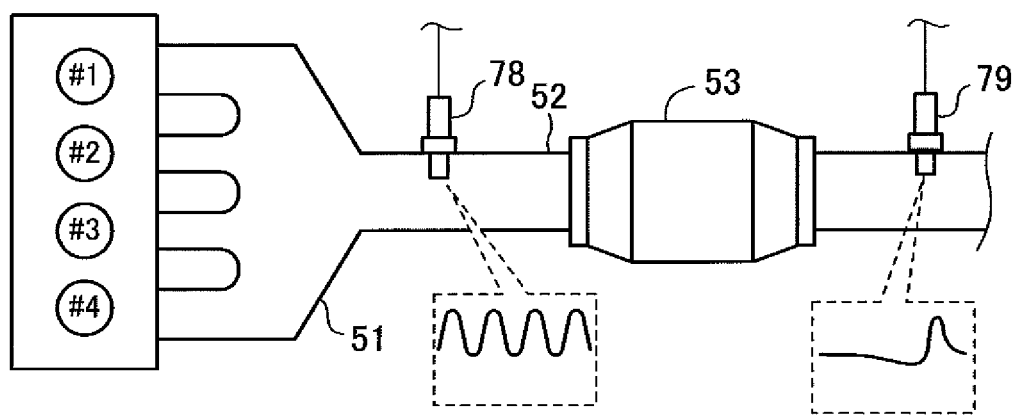
FIG. 2 is a diagram showing a state that a catalyst, an upstream air-fuel ratio sensor, and a downstream air-fuel ratio sensor shown in FIG. 1 are arranged in an exhaust passage.

As shown in FIG. 2, the upstream air-fuel ratio sensor 78 is arranged on the upstream side of the catalyst 53 in a collected exhaust passage formed by collecting together the exhaust passage extending from each of the cylinders (specifically, the exhaust pipe 52). The upstream air-fuel ratio sensor 78 may be a "limiting current type wide air-fuel ratio sensor provided with a diffusion resistance layer" disclosed in Japanese Patent Application Publication No. 1999(H11)-72472, No. 2000-65782, No. 2004-69547, and the like, for example.

Figure 3:
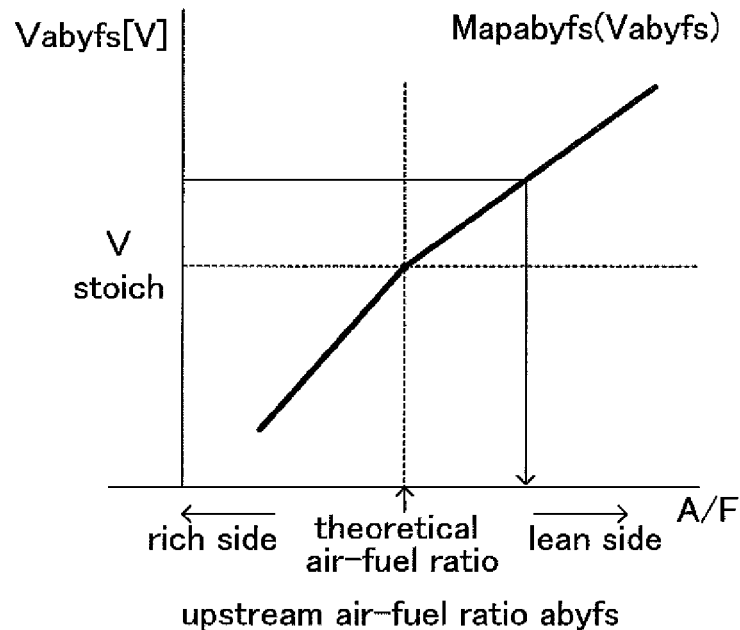
FIG. 3 is a graph showing a relationship between an output of the upstream air-fuel ratio sensor and an air-fuel ratio shown in FIG. 1.

The upstream air-fuel ratio sensor 78 generates an output value Vabyfs (V) in accordance with an air-fuel ratio of a mixing exhaust gas passing through an interior of the exhaust pipe 52 and flowing into the catalyst 53 (therefore, an air-fuel ratio of the fuel-mixing air supplied to the engine 10, more specifically, an air-fuel ratio of the fuel-mixing air in the combustion chamber 25 in each of the cylinders). This output value Vabyfs is converted into an upstream air-fuel ratio (hereinafter, also called as the "detected air-fuel ratio") abyfs indicated by the output value Vabyfs by utilizing an air-fuel ratio conversion table (map) Mapabyfs shown in FIG. 3.

As shown in FIG. 2, the downstream air-fuel ratio sensor 79 is arranged on the downstream side of the catalyst 53 in the collected exhaust passage (specifically, the exhaust pipe 52). The downstream air-fuel ratio sensor 79 is a known electromotive type oxygen concentration sensor (known concentration cell type oxygen concentration sensor using stabilized zirconia). The downstream air-fuel ratio sensor 79 generates an output value Voxs (V) in accordance with an air-fuel ratio of the mixing exhaust gas flowing out from the catalyst 53 (therefore, a time-average value of an air-fuel ratio of the fuel-mixing air supplied to the engine 10 (more specifically, an air-fuel ratio of the fuel-mixing air in the combustion chamber 25 in each of the cylinders)).

Figure 4:
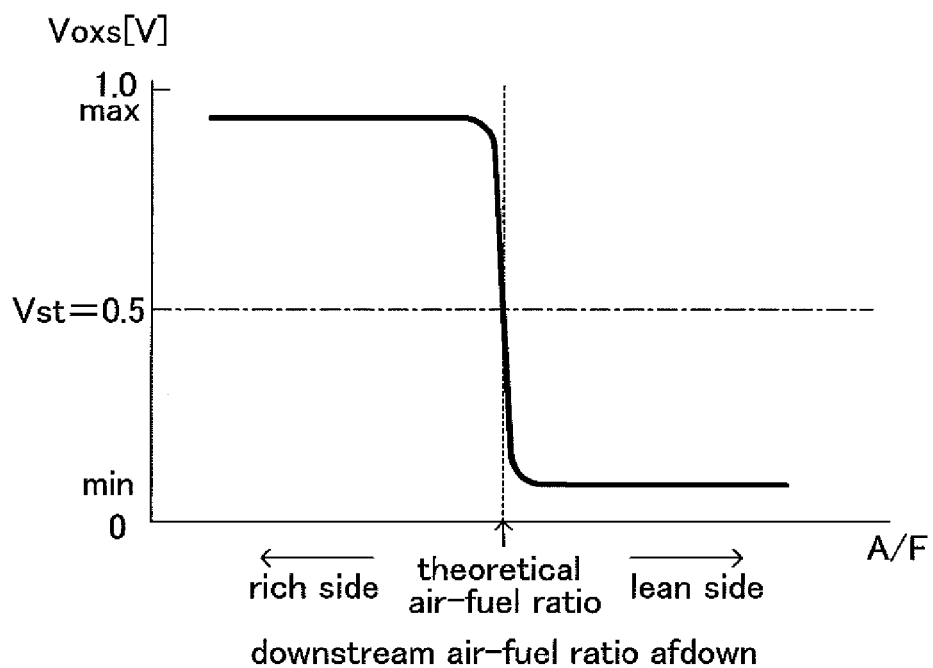
FIG. 4 is a graph showing a relationship between an output of the downstream air-fuel ratio sensor and an air-fuel ratio shown in FIG. 1.

As shown in FIG. 4, this output value Voxs becomes a maximum output value max (such as about 0.9 V) when a downstream air-fuel ratio afdown is on the rich side of a theoretical air-fuel ratio, a minimum output value min (such as about 0.1 V) when the downstream air-fuel ratio afdown is on the lean side of the theoretical air-fuel ratio, and voltage Vst (such as 0.5 V) substantially in the middle of the maximum output value max and the minimum output value min when the downstream air-fuel ratio afdown is the theoretical air-fuel ratio. Further, this output value Voxs rapidly changes from the maximum output value max into the minimum output value min when the downstream air-fuel ratio afdown (air-fuel ratio of the mixing exhaust gas) is changed from the air-fuel ratio on the rich side of the theoretical air-fuel ratio to the air-fuel ratio on the lean side, and rapidly changes from the minimum output value min into the maximum output value max when the downstream air-fuel ratio afdown (air-fuel ratio of the mixing exhaust gas) is changed from the air-fuel ratio on the lean side of the theoretical air-fuel ratio to the air-fuel ratio on the rich side.

The accelerator press-down degree sensor 81 outputs a signal indicating an operation amount Accp of an accelerator pedal AP operated by a driver.

The alcohol concentration sensor 82 is for example a known capacitance type sensor (sensor capable of measuring relative permittivity of an object to be measured using a pair of electrodes) as disclosed in Japanese Patent Application Publication No. 1994(H06)-27073. The alcohol concentration sensor 82 utilizes the fact that the relative permittivity of the alcohol mixing fuel is changed in accordance with alcohol concentration thereof, and outputs an output value in accordance with the alcohol concentration of the fuel flowing in a part in the fuel supply pipe 62 in which the alcohol concentration sensor 82 is arranged (ethanol concentration Cetha in the engine 10 in this embodiment).

An electric control device 90 is a micro computer including a CPU 91, a ROM 92 storing routines (programs) executed by the CPU 91 in advance, tables (maps and functions), invariables, and the like, a RAM 93 temporarily storing data by the CPU 91 on demand, a back-up RAM 94 storing the data in a power activation state and holding the stored data even in a power shut-down state, and an interface 95 including an AD converter, all the members being connected to each other by a bus.

The interface 95 is connected to the sensors 71 to 82, supplies the signals from the sensors 71 to 82 to the CPU 91, and sends drive signals to the actuator 33a of the variable intake timing control device 33, the actuator 36a of the variable exhaust timing control device 36, the igniter 38 in each of the cylinders, the injector 39 provided corresponding to each of the cylinders, and the throttle valve actuator 43a in accordance with commands of the CPU 91.

(Outline of Air-Fuel Ratio Feedback Control)

Next, an outline of feedback control for the air-fuel ratio of the fuel-mixing air in the combustion chamber 25 in each of the cylinders of the engine 10, that is, the "air-fuel ratio of the engine", the feedback control being performed by the present device with the above configuration will be described.

(Purification Ability of Catalyst)

Firstly, when the upstream air-fuel ratio abyfs of the flowing-in mixing exhaust gas, that is, the air-fuel ratio of the engine is the theoretical air-fuel ratio, the ternary catalyst such as the catalyst 53 (hereinafter, called as the "catalyst") oxidizes the unburned matters (HC, CO, and the like) in the mixing exhaust gas and reduces nitrogen oxide (NOx) so as to purify these harmful components in a highly efficient manner. In general, the catalyst has a function of reducing NOx in the mixing exhaust gas so as to store oxygen taken from NOx inside thereof when the upstream air-fuel ratio abyfs (air-fuel ratio of the engine) is the air-fuel ratio on the lean side, and oxidizing HC, CO, and the like in the mixing exhaust gas with the stored oxygen when the upstream air-fuel ratio abyfs is the air-fuel ratio on the rich side (hereinafter, called as the oxygen absorption function).

With the oxygen absorption function of absorbing and discharging oxygen in such a way, even when the upstream air-fuel ratio abyfs (air-fuel ratio of the engine) is varied to some extent from the theoretical air-fuel ratio, the catalyst can purify HC, CO, and NOx. That is, when the upstream air-fuel ratio abyfs becomes lean (that is, the air-fuel ratio of the engine becomes lean) and a large amount of NOx is included in the mixing exhaust gas flowing into the catalyst, the catalyst takes oxygen molecules from NOx and reduces the molecules, absorbs the oxygen molecules, and thereby purifies NOx. When the upstream air-fuel ratio abyfs becomes rich (that is, the air-fuel ratio of the engine becomes rich) and a large amount of HC, CO, and the like are included in the mixing exhaust gas flowing into the catalyst, the catalyst gives (discharges) the absorbed oxygen molecules to these and oxidizes these, and thereby purifies HC, CO, and the like.

Therefore, in order to efficiently purify (oxidize) a large amount of HC, CO, and the like continuously flowing in by the catalyst, the catalyst has to store a large amount of oxygen. Conversely, in order to efficiently purify (reduce) a large amount of NOx continuously flowing in, the catalyst has to be in a state where oxygen can sufficiently be stored. Accordingly, a purification ability of the catalyst depends on a maximum oxygen amount that the catalyst is capable of storing (maximum oxygen storage amount).

Meanwhile, the ternary catalyst such as the catalyst 53 is deteriorated by poisoning due to lead, sulfur, and the like included in the fuel or heat added to the catalyst, and along with this, a maximum oxygen absorption amount is gradually lowered. When the catalyst continuously purifies (oxidizes) a large amount of HC, CO, and the like, the stored amount of oxygen becomes insufficient and the purification ability is lowered. When the catalyst continuously purifies (oxidizes) a large amount of NOx, the catalyst fails to store oxygen anymore and the purification ability is lowered. In order to suppress such lowering of the maximum oxygen absorption amount and lowering of the purification ability, repeatedly performed control is needed in a manner that the upstream air-fuel ratio abyfs (air-fuel ratio of the engine) is forcibly changed into the air-fuel ratio on the rich side and the air-fuel ratio on the lean side of the theoretical air-fuel ratio, so that the catalyst repeats a state of absorbing the oxygen molecules (that is, making an interior of the catalyst an oxidation atmosphere) and a state of discharging the oxygen molecules (that is, making the interior of the catalyst a reduction atmosphere).

(Determination of Atmosphere in Interior of Catalyst)

As described above, in order to suppress the lowering of the maximum oxygen absorption amount and the lowering of the purification ability, it is effective to repeatedly change the upstream air-fuel ratio abyfs into the air-fuel ratio on the rich side and the air-fuel ratio on the lean side of the theoretical air-fuel ratio in accordance with the atmosphere in the interior of the catalyst. Whether the catalyst 53 absorbs oxygen up to the vicinity of the maximum oxygen absorption amount and the interior of the catalyst 53 is the oxidation atmosphere or the catalyst 53 discharges oxygen up to an oxygen absorption amount in the vicinity of "zero" and the interior of the catalyst 53 is the reduction atmosphere can be determined based on the output value Voxs of the downstream air-fuel ratio sensor 79.

Now, assuming a case where the flow rate Ga of the intake air taken into the engine 10 is small and the upstream air-fuel ratio abyfs is the air-fuel ratio on the lean side. In this case, by taking and absorbing the oxygen molecules from NOx flowing into the interior by the catalyst 53, NOx flowing into the interior of the catalyst 53 is purified (reduced). Therefore, the output value Voxs of the downstream air-fuel ratio sensor 79 becomes larger than the voltage Vst and not more than the maximum output value max, and the air-fuel ratio of the mixing exhaust gas flowing out from the catalyst 53, that is, the downstream air-fuel ratio afdown becomes the air-fuel ratio on the rich side. When the catalyst continuously purifies (reduces) NOx continuously flowing into the interior of the catalyst 53, the oxygen molecules absorbed by the catalyst 53 become the maximum oxygen absorption amount, and the purification ability of NOx after that is lowered.

Therefore, in the catalyst 53 already absorbing the oxygen molecules up to the maximum oxygen absorption amount, the interior thereof becomes the oxidation atmosphere, and the output value Voxs of the downstream air-fuel ratio sensor 79 is rapidly changed from the maximum output value max into the minimum output value min because of the NOx flowing out without being purified (reduced). That is, when the downstream air-fuel ratio afdown is changed from the air-fuel ratio on the rich side to the air-fuel ratio on the lean side, the output value Voxs of the downstream air-fuel ratio sensor 79 is rapidly changed from the maximum output value max to the minimum output value min. Because of this, whether or not the interior of the catalyst 53 is changed from the reduction atmosphere to the oxidation atmosphere can be determined.

Meanwhile, when the upstream air-fuel ratio abyfs is the air-fuel ratio on the rich side, HC, CO, and the like flowing into the interior of the catalyst 53 are purified (oxidized) by discharging the absorbed (stored) oxygen molecules. Therefore, the output value Voxs of the downstream air-fuel ratio sensor 79 becomes smaller than the voltage Vst and not less than the minimum output value min, and the downstream air-fuel ratio afdpwn becomes the air-fuel ratio on the lean side. When HC, CO, and the like continuously flowing into the interior of the catalyst 53 are continuously purified (oxidized), the oxygen absorption amount of the catalyst 53 becomes substantial "zero", and the purification ability of HC, CO, and the like after that is lowered.

Therefore, in the catalyst 53 with a small oxygen absorption amount, the interior thereof becomes the reduction atmosphere, and the output value Voxs of the downstream air-fuel ratio sensor 79 is rapidly changed from the minimum output value min to the maximum output value max by the flowing-out HC, CO, and the like. That is, when the downstream air-fuel ratio afdown is changed from the air-fuel ratio on the lean side to the air-fuel ratio on the rich side, the output value Voxs of the downstream air-fuel ratio sensor 79 is rapidly changed from the minimum output value min to the maximum output value max. Thus, whether or not the interior of the catalyst 53 is changed from the oxidation atmosphere to the reduction atmosphere can be determined.

(Forcible Change (Alternation) of Upstream Air-Fuel Ratio)

As described above, when the upstream air-fuel ratio abyfs is the air-fuel ratio on the lean side, by purifying (reducing) NOx flowing into the interior of the catalyst 53, an amount of oxygen absorbed (stored) in the interior of the catalyst 53 is increased to the maximum oxygen absorption amount, and the interior becomes the oxidation atmosphere. When the interior of the catalyst 53 becomes the oxidation atmosphere in such a way, there is a fear that the purification ability (reducing ability) of NOx is lowered and NOx flows out. In this case, there is a need for discharging (consuming) the absorbed (stored) oxygen molecules in order to decrease the stored oxygen amount, by promptly changing the upstream air-fuel ratio abyfs from the air-fuel ratio on the lean side to the air-fuel ratio on the rich side, making HC, CO, and the like flow into the interior of the catalyst 53, and purifying (oxidizing) the flowing-in HC, CO, and the like.

Meanwhile, as described above, when the upstream air-fuel ratio abyfs is the air-fuel ratio on the rich side, by purifying (oxidizing) HC, CO, and the like flowing into the interior of the catalyst 53, the amount of oxygen absorbed (stored) in the interior of the catalyst 53 is decreased to the vicinity of "zero", and the interior becomes the reduction atmosphere. When the interior of the catalyst 53 becomes the reduction atmosphere in such a way, there is a fear that the purification ability (oxidizing ability) of HC, CO, and the like as unburned matters is lowered and HC, CO, and the like flow out. In this case, there is a need for increasing the amount of the stored oxygen by promptly changing the upstream air-fuel ratio abyfs from the air-fuel ratio on the rich side to the air-fuel ratio on the lean side, making NOx flow into the interior of the catalyst 53, and purifying (reducing) the flowing-in NOx.

(Basic Air-Fuel Ratio Control)

Next, an outline of basic air-fuel ratio control by the present device will be described. In the present device, when the engine 10 is in a normal operation state, control is performed in a manner that an upstream target air-fuel ratio (target air-fuel ratio of the engine) is forcibly changed to the air-fuel ratio on the lean side or the air-fuel ratio on the rich side in accordance with a rapid change in the output value Voxs of the downstream air-fuel ratio sensor 79 as described above, that is, whether the interior of the catalyst 53 is the oxidation atmosphere or the reduction atmosphere.

Figure 5:
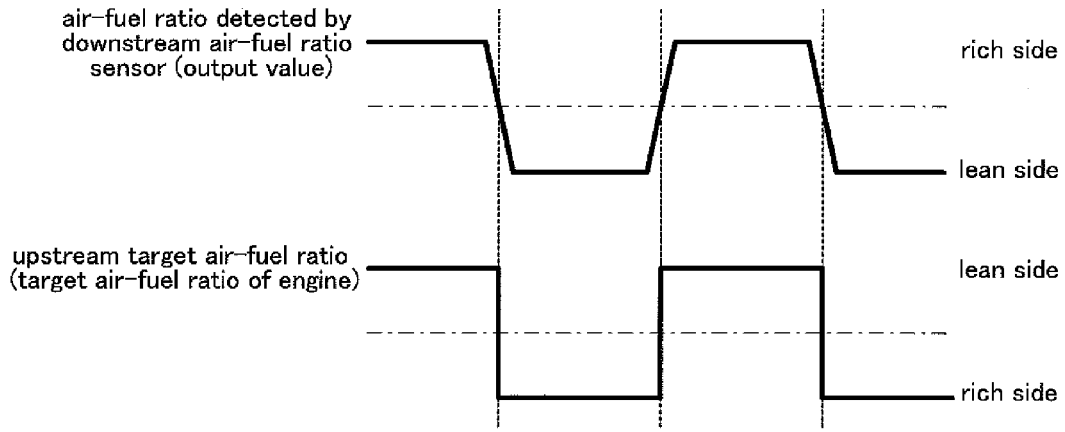
FIG. 5 is a diagram showing a relationship between the upstream air-fuel ratio and the downstream air-fuel ratio in basic air-fuel ratio control.

Specifically, as shown in FIG. 5, when the downstream air-fuel ratio afdown is the air-fuel ratio on the rich side based on the output value Voxs of the downstream air-fuel ratio sensor 79, the control is performed in a manner that the upstream target air-fuel ratio (target air-fuel ratio of the engine) becomes the air-fuel ratio on the lean side, and when the downstream air-fuel ratio afdown is the air-fuel ratio on the lean side based on the output value Voxs of the downstream air-fuel ratio sensor 79, the control is performed in a manner that the upstream target air-fuel ratio (target air-fuel ratio of the engine) becomes the air-fuel ratio on the rich side.

When the output value Voxs of the downstream air-fuel ratio sensor 79 is rapidly changed from the maximum output value max to the minimum output value min, the control is performed by changing (altering) (more specifically, largely changing an amplitude of) the upstream target air-fuel ratio (target air-fuel ratio of the engine) from the air-fuel ratio on the lean side to the air-fuel ratio on the rich side. When the output value Voxs of the downstream air-fuel ratio sensor 79 is rapidly changed from the minimum output value min to the maximum output value max, the control is performed by changing (altering) (more specifically, largely changing the amplitude of) the upstream target air-fuel ratio (target air-fuel ratio of the engine) from the air-fuel ratio on the rich side to the air-fuel ratio on the lean side.

The present device performs the feedback control on the air-fuel ratio of the engine by controlling a fuel jet amount by the injector 39 in a manner that the output values of the upstream air-fuel ratio sensor 78 and the downstream air-fuel ratio sensor 79 respectively match with corresponding sensor target values (specifically, values corresponding to the air-fuel ratio on the rich side of the theoretical air-fuel ratio or the air-fuel ratio on the lean side of the theoretical air-fuel ratio in accordance with the output value Voxs of the downstream air-fuel ratio sensor 79).

(Determination of Basic Fuel Jet Amount)

Firstly, an example of determination of a basic fuel jet amount Fbase will be described. For determining the basic fuel jet amount Fbase, an upstream target air-fuel ratio abyfr (that is, the target air-fuel ratio of the engine) corresponding to an output target value of the upstream air-fuel ratio sensor 78 (upstream target value) is determined based on the engine rotation speed NE, the throttle valve opening degree TA, and the like as an operation state of the internal combustion engine 10. Then, the upstream target air-fuel ratio abyfr is set in advance so as to be changed to the value corresponding to the air-fuel ratio on the rich side of the theoretical air-fuel ratio or the air-fuel ratio on the lean side of the theoretical air-fuel ratio in accordance with the output value Voxs of the downstream air-fuel ratio sensor 79 as described above. The upstream target air-fuel ratio abyfr is stored in the RAM 93 corresponding to an intake stroke of each of the cylinders. When the upstream target air-fuel ratio abyfr is determined in such a way, the basic fuel jet amount Fbase is determined by dividing an in-cylinder intake air flow rate Mc as an intake air flow rate of the cylinder subjected to the intake stroke of this time, the in-cylinder intake air flow rate determined based on a predetermined table taking the intake air flow rate Ga measured by the air flow meter 71 and the engine rotation speed NE obtained based on an output of the crank position sensor 76 as arguments, by the determined upstream target air-fuel ratio abyfr.

(Calculation of Fuel Jet Amount)

Next, calculation of a fuel jet amount Fi will be described. The fuel jet amount Fi is determined by multiplying the above basic fuel jet amount Fbase by a downstream feedback correction amount and an upstream feedback correction amount. It should be noted that the downstream feedback correction amount is determined by, for example, performing PID treatment on a deviation between the output value Voxs of the downstream air-fuel ratio sensor 79 and a downstream target value Voxsref as a target value of an output of the downstream air-fuel ratio sensor based on the engine rotation speed NE, the throttle valve opening degree TA, and the like as the operation state of the internal combustion engine 10. The downstream target value Voxsref is set in a manner that a downstream target air-fuel ratio afdownref corresponding to the downstream target value Voxsref always matches the above upstream target air-fuel ratio abyfr. The upstream feedback correction amount is determined by, for example, determining the current detected air-fuel ratio abyfs by the upstream air-fuel ratio sensor 78 based on the output value Vabyfs of the upstream air-fuel ratio sensor 78 and the air-fuel ratio conversion table Mapabyfs shown in FIG. 3, and performing the PID treatment on a deviation between this detected air-fuel ratio abyfs and the above upstream target air-fuel ratio abyfr.

In such a way, in the present device, the fuel of the fuel jet amount Fi obtained by correcting the basic fuel jet amount Fbase by means of the downstream feedback correction amount and the upstream feedback correction amount is jetted to the cylinder subjected to the intake stroke of this time by the injector 39. Thereby, the present device can perform the feedback control on the air-fuel ratio of the engine in a manner that the air-fuel ratio becomes the air-fuel ratio on the rich side of the theoretical air-fuel ratio or the air-fuel ratio on the lean side of the theoretical air-fuel ratio.

(Relationship Between Intake Air Flow Rate and Purification of NOx)

As described above, the upstream air-fuel ratio abyfs is forcibly changed (altered) based on a change in the atmosphere in the interior of the catalyst 53, in other words, a change in the output value Voxs of the downstream air-fuel ratio sensor 79. Particularly, the upstream air-fuel ratio abyfs is forcibly changed (altered) from the air-fuel ratio on the lean side to the air-fuel ratio on the rich side based on the rapid change in the output value Voxs of the downstream air-fuel ratio sensor 79 from the maximum output value max to the minimum output value min, that is, whether or not NOx is detected.

In the interior of the catalyst 53, as described above, the oxygen molecules are taken from NOx flowing-in by the oxygen absorption function and then NOx is reduced and purified. That is, when the atmosphere in the interior of the catalyst 53 is the reduction atmosphere, and when the intake air flow rate Ga is small, the flowing-in NOx can be reduced by coming into contact with a surface in the interior of the catalyst 53. Meanwhile, when the intake air flow rate Ga is increased, an amount of NOx coming into contact with the surface in the interior of the catalyst 53 is relatively decreased, and the mixing exhaust gas blows by in the catalyst 53. Thus, there is sometimes a case where reduction of NOx is impaired.

Specifically, in the case where the intake air flow rate Ga is small, a relatively small amount of the mixing exhaust gas passes through in the catalyst 53. Thus, NOx included in the mixing exhaust gas can favorably come into contact with the surface in the interior of the catalyst 53, and efficiently reduced and purified. Meanwhile, when the intake air flow rate Ga is increased, a large amount of the mixing exhaust gas passes through in the catalyst 53. Thus, a part of NOx included in the mixing exhaust gas that fails to come into contact with the surface in the interior of the catalyst 53 is left. As a result, NOx flowing out (blowing by) without being reduced exists. Since the reduction and purification of NOx by the above oxygen absorption function is achieved through contact of the flowing-in NOx with the surface in the interior of the catalyst 53, the function is affected by a state that the mixing exhaust gas passes through in the catalyst 53, and more specifically by the intake air flow rate Ga.

Figure 6:
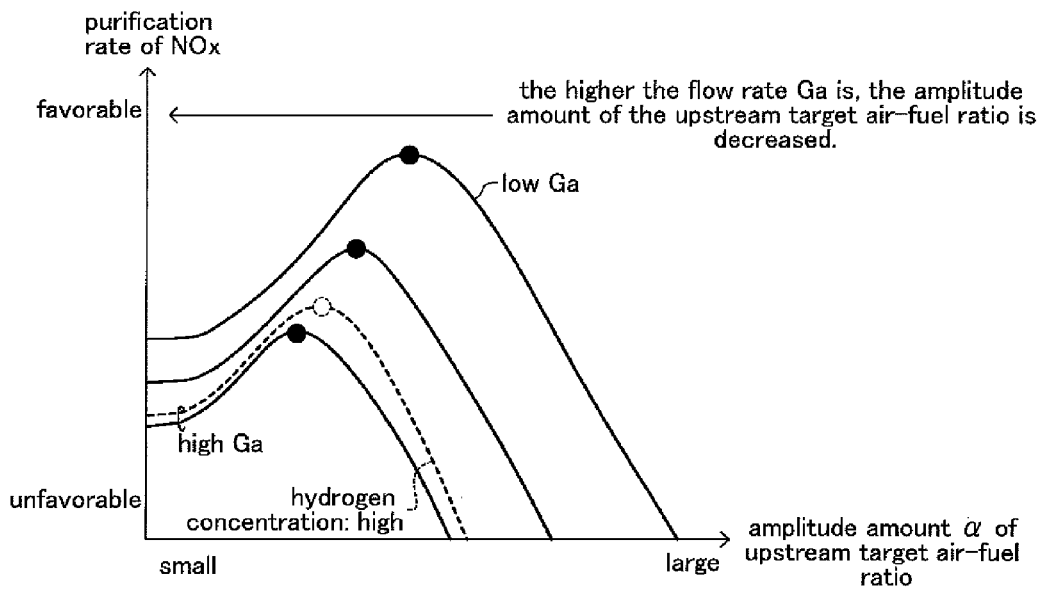
FIG. 6 is a graph showing a relationship between an amplitude amount of an upstream target air-fuel ratio relative to an intake air flow rate and a purification rate of NOx.

Therefore, in order to prevent flow-out of NOx from the catalyst 53, in other words, to maintain reduction efficiency of NOx by the catalyst 53 (hereinafter, also called as the "reduction rate"), in general, there is a need for decreasing a variation amount from the theoretical air-fuel ratio of the upstream target air-fuel ratio to the lean side (hereinafter, this variation amount is called as the amplitude amount) in the above basic air-fuel ratio control in accordance with an increase in the intake air flow rate Ga as shown in FIG. 6. In such a way, by changing the amplitude amount in the basic air-fuel ratio control to a smaller value relative to the increase in the intake air flow rate Ga, an amount of the blowing-by NOx can be relatively decreased. Thus, the flow-out of NOx from the catalyst 53 can be prevented. It should be noted that a relationship between the amplitude amount of the upstream target air-fuel ratio and a purification rate of NOx shown by a solid line in FIG. 6 schematically shows a relationship in the case where the fuel is made of only gasoline.

Meanwhile, by suppressing the amplitude amount from the theoretical air-fuel ratio to the lean side to a smaller value in the basic air-fuel ratio control, there is an anxiety that an effect of repeatedly changing the interior of the catalyst 53 to the oxidation atmosphere or the reduction atmosphere so as to activate the oxygen absorption function of the catalyst 53 is reduced. By suppressing the amplitude amount from the theoretical air-fuel ratio to the lean side to a smaller value in the basic air-fuel ratio control, it becomes difficult to realize lower fuel consumption.

(Influence of Alcohol Concentration in Fuel on Atmosphere in Interior of Catalyst)

When the concentration of alcohol included in the alcohol mixing fuel is increased, hydrogen concentration in the mixing exhaust gas is increased as described above. Therefore, when the alcohol mixing fuel is supplied into the combustion chamber 25 in each of the cylinders and the mixing exhaust gas flows into the catalyst 53, the hydrogen concentration in the interior of the catalyst 53 is increased. Hydrogen acts as a so-called strongly reducing agent. Therefore, the interior of the catalyst 53 in which the hydrogen concentration is increased becomes the reduction atmosphere.

In this case, in the interior of the catalyst 53, since the reduction atmosphere is added along with an increase of the hydrogen concentration to the reduction atmosphere by the oxygen absorption function as described above, NOx flowing into the interior of the catalyst 53 can more efficiently be purified (reduced). That is, even when the intake air flow rate Ga is increased, by the reduction atmosphere along with the increase of the hydrogen concentration, the catalyst 53 can purify (reduce) NOx.

Thereby, as shown by a broken line in FIG. 6, with the equal intake air flow rate Ga, even when the amplitude amount from the theoretical air-fuel ratio to the lean side in the basic air-fuel ratio control is increased in comparison to a case of only gasoline shown by the solid line, the catalyst 53 can purify (reduce) NOx by the reduction atmosphere along with the increase of the hydrogen concentration and prevent the flow-out of NOx. As a result, the rapid change in the output value Voxs of the downstream air-fuel ratio sensor 79 from the maximum value max to the minimum value min by NOx flowing out due to the blowing-by even when the atmosphere in the interior of the catalyst 53 still keeps the reduction atmosphere can favorably be suppressed, and thus false determination that the atmosphere in the interior of the catalyst 53 is changed to the oxidation atmosphere can be prevented. Hydrogen existing in the interior of the catalyst 53 is consumed for purifying (reducing) NOx flowing into the interior of the catalyst 53 by a large amount by increasing the amplitude amount from the theoretical air-fuel ratio to the lean side in the basic air-fuel ratio control.

By preventing the false determination of the atmosphere in the interior of the catalyst 53 in such a way and properly consuming hydrogen existing in the interior of the catalyst 53, a forcible change (alteration) from the air-fuel ratio on the lean side to the air-fuel ratio on the rich side even when the interior of the catalyst 53 is the reduction atmosphere in the basic air-fuel ratio control can be prevented. Therefore, it is possible to prevent flowing-in of HC, CO, and the like requiring purification by means of oxidation into the catalyst 53 of which interior is the reduction atmosphere. As a result, it is also possible to prevent flowing-out of HC, CO, and the like effectively.

(Actual Operation)

Figure 7:
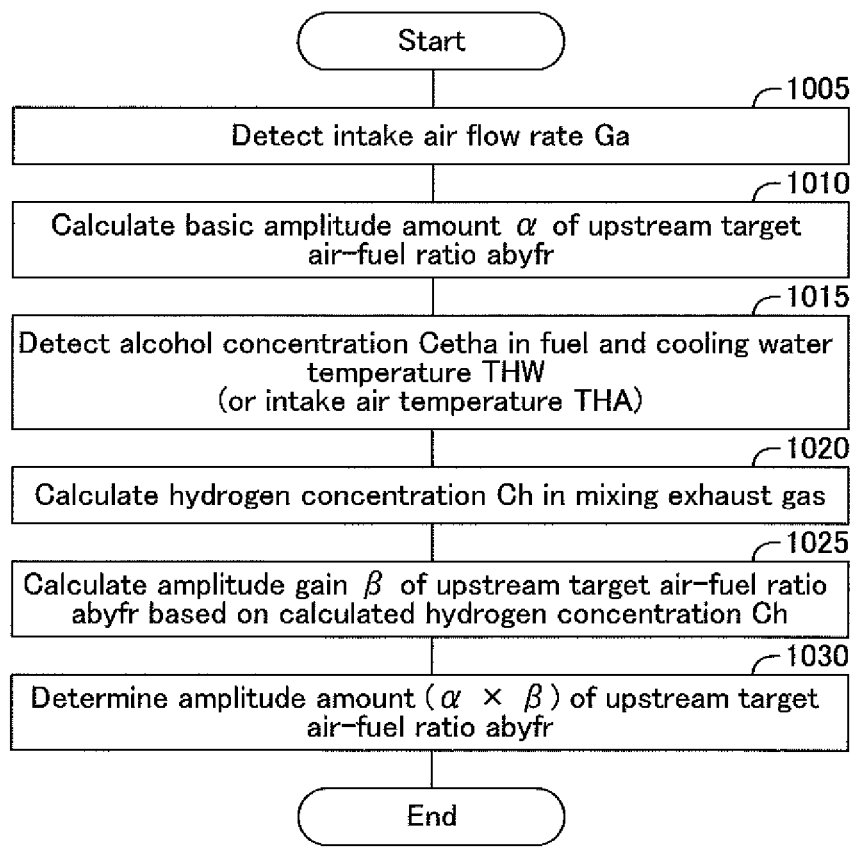
FIG. 7 is a flowchart showing a routine executed by a CPU shown in FIG. 1.

Next, actual operations of the control device according to the present embodiment will be described. FIG. 7 is a flowchart showing an example of flow of a processing routine for "changing the amplitude amount of the basic air-fuel ratio control in accordance with the hydrogen concentration in the mixing exhaust gas" executed by the CPU 91 of the present device. In this example, firstly, in Step 1005, the intake air flow rate Ga is detected based on the signal acquired from the air flow meter 71.

Next, in Step 1010, based on the relationship between the amplitude amount of the upstream target air-fuel ratio and the purification rate of NOx shown by the solid line in FIG. 6, an amplitude amount α of the upstream target air-fuel ratio abyfr (hereinafter, this amplitude amount is also called as the basic amplitude amount α) corresponding to the intake air flow rate Ga detected in Step 1005 is calculated. That is, the basic amplitude amount α calculated in this Step 1010 does not relate to the alcohol concentration in the fuel (that is, the fuel of only gasoline), but is the amplitude amount α of the upstream target air-fuel ratio abyfr corresponding to the flow rate Ga of the simply taken intake air.

In such a way, when the basic amplitude amount α is calculated in Step 1010, in the following Step 1015, the ethanol concentration Cetha as the alcohol concentration in the fuel is detected based on an output value acquired from the alcohol concentration sensor 82, and the cooling water temperature THW as an operation state temperature of the engine is detected based on the signal acquired from the water temperature sensor 77 (or the intake air temperature THA is detected based on the signal acquired from the intake air temperature sensor 72). After the ethanol concentration Cetha is detected and the cooling water temperature THW (or the intake air temperature THA) is detected in such a way, in Step 1020, a map in FIG. 8 defining a relationship between the alcohol concentration and the water temperature and the hydrogen concentration in the mixing exhaust gas is referred to, and hydrogen concentration Ch in the mixing exhaust gas corresponding to the detected ethanol concentration Cetha and the detected cooling water temperature THW (or the detected intake air temperature THA) is calculated.

Figure 8:
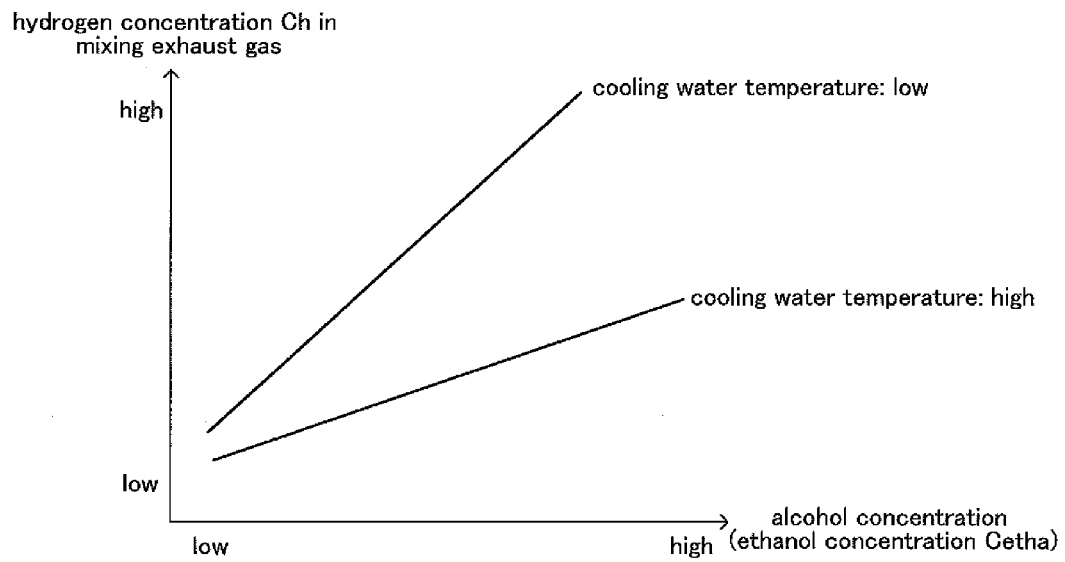
FIG. 8 is a graph showing a relationship between alcohol concentration in fuel and a cooling water temperature and hydrogen concentration in a mixing exhaust gas.

The hydrogen concentration Ch in the mixing exhaust gas (hereinafter, also simply called as the "hydrogen concentration Ch") is increased as the ethanol concentration Cetha in the fuel is increased as shown in FIG. 8. A change mode of the hydrogen concentration Ch relative to an increase in the ethanol concentration Cetha is differentiated in accordance with the cooling water temperature THW (or the intake air temperature THA). That is, in a state where the cooling water temperature THW (or the intake air temperature THA) is low leading to a state that alcohol in the fuel (in more detail, ethanol in the fuel) is not easily atomized and not easily combusted, alcohol (ethanol) is apt to be discharged as it is unburned as the exhaust gas. Thus, the hydrogen concentration Ch is largely increased along with the increase in the ethanol concentration Cetha.

Meanwhile, in a state where the cooling water temperature THW (or the intake air temperature THA) is high leading to a state that alcohol in the fuel (in more detail, ethanol in the fuel) is easily atomized and easily combusted, only part of alcohol (ethanol) is discharged as it is unburned as the exhaust gas. Thus, the hydrogen concentration Ch is gently increased in accordance with the increase in the ethanol concentration Cetha in comparison to the state that the cooling water temperature THW (or the intake air temperature THA) is low. After the hydrogen concentration Ch is calculated, the processing goes on to Step 1025.

Figure 9:
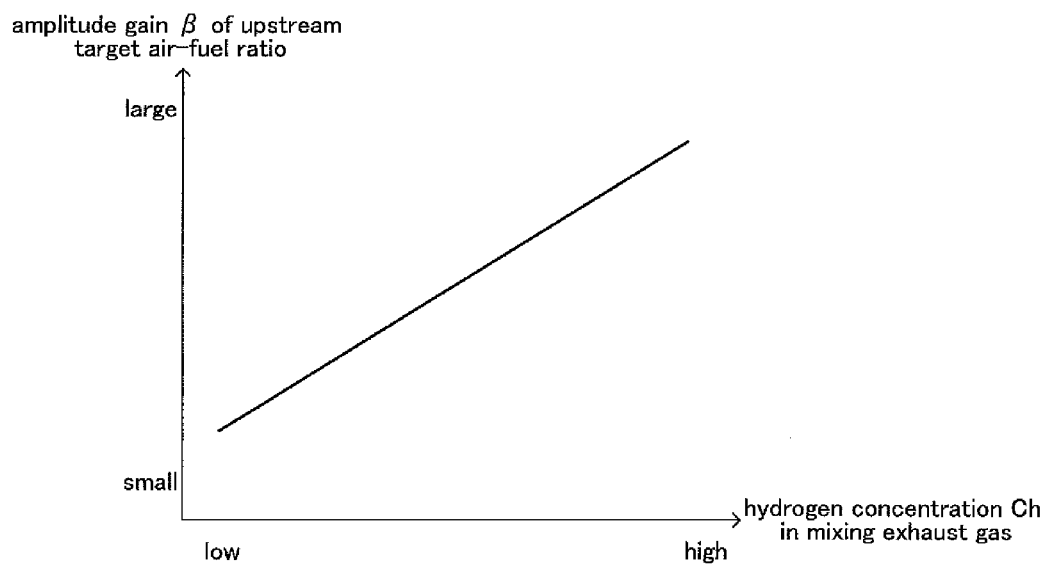
FIG. 9 is a graph showing a relationship between the hydrogen concentration in the mixing exhaust gas and amplitude gain of the upstream target air-fuel ratio.

In Step 1025, with a reference to a map in FIG. 9 defining a relationship between the hydrogen concentration in the mixing exhaust gas and amplitude gain of the upstream target air-fuel ratio, amplitude gain β of the upstream target air-fuel ratio abyfr (hereinafter, also simply called as the "amplitude gain β") corresponding to the hydrogen concentration Ch calculated in Step 1020 is calculated. As the hydrogen concentration Ch is increased, the calculated amplitude gain β becomes a larger value than "1", for example. After the amplitude gain β of the upstream target air-fuel ratio abyfr is calculated, the processing in Step 1030 is executed.

In Step 1030, by multiplying the basic amplitude amount α of the upstream target air-fuel ratio abyfr calculated in Step 1010 by the amplitude gain β calculated in Step 1025, an amplitude amount of the basic air-fuel ratio control in accordance with the alcohol concentration in the fuel (specifically, the ethanol concentration Cetha), in other words, an amplitude amount (α×β) of the upstream target air-fuel ratio abyfr is determined. That is, as the hydrogen concentration Ch in the mixing exhaust gas is increased, the mixing exhaust gas with higher hydrogen concentration Ch flows into the interior of the catalyst 53, and thus the hydrogen concentration Ch in the interior of the catalyst 53 is increased. As a result, in the interior of the catalyst 53, NOx is reduced by a change in the atmosphere into the reduction atmosphere in accordance with an increase in the hydrogen concentration Ch, in addition to a reduction action of NOx by the above oxygen absorption function. Therefore, as shown by the broken line in FIG. 6, even when the intake air flow rate Ga is increased in accordance with the change in the interior of the catalyst 53 into the reduction atmosphere along with the increase in the hydrogen concentration Ch, the purification rate of NOx can be improved.

As described above, according to the embodiment of the present invention (specifically, the processing shown in FIG. 7), the intake air flow rate Ga is detected (Step 1005), and the basic amplitude amount α of the upstream target air-fuel ratio abyfr corresponding to this detected intake air flow rate Ga is calculated (Step 1010). That is, in Steps 1005, 1010, the processing is performed regardless of whether alcohol is included in the fuel or not.

Next, the alcohol concentration in the fuel (in more detail, the ethanol concentration Cetha) and the cooling water temperature THW (or the intake air temperature THA) as the operation state temperature of the engine 10 are detected (Step 1015), the hydrogen concentration Ch in the mixing exhaust gas is calculated based on the detected ethanol concentration Cetha and the detected cooling water temperature THW (or the detected intake air temperature THA) (Step 1020), the amplitude gain β corresponding to the calculated hydrogen concentration Ch is calculated (Step 1025), and finally, the amplitude amount (α×β) of the upstream target air-fuel ratio abyfr is calculated (Step 1030).

Therefore, in the case where the alcohol concentration in the fuel (ethanol concentration Cetha) is high, that is, the hydrogen concentration Ch in the mixing exhaust gas is high, the amplitude amount (α×β) of the upstream target air-fuel ratio abyfr is determined so as to be larger than that in the case where the hydrogen concentration Ch in the mixing exhaust gas is low. Thereby, in the case where the upstream target air-fuel ratio abyfr is repeatedly changed toward the lean side and the rich side in accordance with the basic air-fuel ratio control shown in FIG. 5 for the purpose of activating the purification ability of the catalyst 53, the purification ability of the catalyst 53 can sufficiently be activated because of a large amplitude amount. As a result, the purification rate of emissions by the catalyst 53 can properly be maintained.

In the case where the alcohol mixing fuel is supplied to the engine 10, particularly since the amplitude amount (α×β) from the theoretical air-fuel ratio to the lean side in the basic air-fuel ratio control can be determined to be large, the amount of NOx flowing into the interior of the catalyst 53 can be increased. Thereby, a consumption amount of hydrogen for purifying (reducing) NOx is increased and the hydrogen concentration Ch in the interior of the catalyst 53 is properly decreased. Therefore, it is possible to properly change the atmosphere in the interior of the catalyst 53 from the reduction atmosphere into the oxidation atmosphere, and to effectively prevent false detection of the atmosphere in the interior of the catalyst 53. Further, since a large amount of NOx can be purified (reduced) by utilizing hydrogen as the strongly reducing agent, the purification rate of NOx by the catalyst 53 can also be improved to a large extent.

It should be noted that the present invention is not limited to the above embodiment, but various modifications can be employed within the scope of the present invention. For example, in the above embodiment, the intake air flow rate Ga is detected, and the basic amplitude amount α of the upstream target air-fuel ratio abyfr in accordance with this detected intake air flow rate Ga is calculated (Steps 1005, 1010 in FIG. 7).

In this case, irrespective of the intake air flow rate Ga, as long as the basic amplitude amount α of the upstream target air-fuel ratio abyfr is determined in advance, Steps 1005, 1010 in FIG. 7 can be omitted, and the amplitude gain β can be calculated based on the hydrogen concentration Ch in the mixing exhaust gas.

In the above embodiment, the hydrogen concentration Ch in the mixing exhaust gas is estimated and calculated based on the detected ethanol concentration Cetha and the detected cooling water temperature THW (or the detected intake air temperature THA). In this case, needless to say, the hydrogen concentration Ch in the mixing exhaust gas can directly be detected. It should be noted that in this case, a hydrogen concentration detection sensor may be arranged in the exhaust pipe 52 on the upstream side of the catalyst 53.

Further, in the above embodiment, the upstream target air-fuel ratio abyfr (that is, the air-fuel ratio of the engine) is set to the air-fuel ratio on the rich side of an ideal air-fuel ratio or the air-fuel ratio on the lean side of the ideal air-fuel ratio. However, needless to say, the upstream target air-fuel ratio abyfr (that is, the air-fuel ratio of the engine) may be set to the ideal air-fuel ratio.

The invention claimed is:

1. A control device of an internal combustion engine to be applied to an internal combustion engine including:
   a fuel-mixing air supply means that supplies fuel-mixing air made of fuel including at least gasoline and air to a combustion chamber of the internal combustion engine;
   a catalyst arranged in an exhaust passage through which an exhaust gas discharged from the combustion chamber passes;
   an air-fuel ratio sensor arranged in the exhaust passage on the downstream side of the catalyst, the air-fuel ratio sensor that generates an output value in accordance with the air-fuel ratio of the exhaust gas passing through the exhaust passage; and
   a target air-fuel ratio setting means that sets a target air-fuel ratio of the fuel-mixing air based on the output value from the air-fuel ratio sensor, the control device of the internal combustion engine, comprising:
   a hydrogen concentration detection means that detects hydrogen concentration in the exhaust gas discharged from the combustion chamber; and
   a correction means that corrects the target air-fuel ratio set by the target air-fuel ratio setting means based on the hydrogen concentration detected by the hydrogen concentration detection means; and
   an intake air flow rate detection means that detects an intake air flow rate indicating mass of air taken into the internal combustion engine per unit time, wherein
   the target air-fuel ratio setting means sets the target air-fuel ratio by changing an amplitude amount indicating a variation amount from a theoretical air-fuel ratio to the lean side or the rich side based on the intake air flow rate detected by the intake air flow rate detection means,
   the correction means corrects at least the changed amplitude amount from the theoretical air-fuel ratio to the lean side based on the hydrogen concentration detected by the hydrogen concentration detection means,
   the target air-fuel ratio setting means sets the target air-fuel ratio to an air-fuel ratio on the rich side of the theoretical air-fuel ratio based on the output value of the air-fuel ratio sensor corresponding to a change in an interior of the catalyst from a reduction atmosphere that reduces the exhaust gas flowing into the catalyst to an oxidation atmosphere that oxidizes the exhaust gas flowing into the catalyst, and
   the target air-fuel ratio setting means sets the target air-fuel ratio to an air-fuel ratio on the lean side of the theoretical air-fuel ratio based on the output value of the air-fuel ratio sensor corresponding to a change in the interior of the catalyst from the oxidation atmosphere to the reduction atmosphere.

2. The control device of the internal combustion engine according to claim 1, wherein
   the correction means corrects the target air-fuel ratio set by the target air-fuel ratio setting means in a manner that the higher the hydrogen concentration detected by the hydrogen concentration detection means is, the more the target air-fuel ratio is changed toward the lean side.

3. The control device of the internal combustion engine according to claim 1, comprising:
   an alcohol concentration detection means that detects alcohol concentration as concentration of an alcohol component included in the fuel supplied to the combustion chamber of the internal combustion engine; and a temperature detection means that detects an operation state temperature of the internal combustion engine, wherein the hydrogen concentration detection means detects the hydrogen concentration in the exhaust gas based on the alcohol concentration detected by the alcohol concentration detection means and the operation state temperature detected by the temperature detection means.

4. The control device of the internal combustion engine according to claim 1, wherein the air-fuel ratio sensor is a concentration cell type oxygen concentration sensor.

* * * * *